United States Patent
Kim et al.

(10) Patent No.: US 9,561,726 B2
(45) Date of Patent: Feb. 7, 2017

(54) APPARATUS AND METHOD FOR CALCULATING REGENERATIVE BRAKING AMOUNT OF HYBRID ELECTRIC VEHICLE

(71) Applicants: Hyundai Motor Company, Seoul (KR); Kia Motors Corporation, Seoul (KR)

(72) Inventors: Sang Joon Kim, Seoul (KR); Joonyoung Park, Seoul (KR); Sungdeok Kim, Gyeonggi-Do (KR); Kyu Hwan Jo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 107 days.

(21) Appl. No.: 14/551,025

(22) Filed: Nov. 23, 2014

(65) Prior Publication Data

US 2016/0031325 A1 Feb. 4, 2016

(30) Foreign Application Priority Data

Jul. 31, 2014 (KR) .................. 10-2014-0098530

(51) Int. Cl.
*B60L 7/18* (2006.01)
*B60T 8/32* (2006.01)
(Continued)

(52) U.S. Cl.
CPC .............. *B60L 7/18* (2013.01); *B60L 11/08* (2013.01); *B60L 11/14* (2013.01); *B60L 11/1803* (2013.01);
(Continued)

(58) Field of Classification Search
CPC ....... B60L 11/08; B60L 11/14; B60L 11/1803; B60L 15/2009; B60L 2240/12; B60L 2240/423; B60L 2260/44; B60L 7/18; B60T 8/326; B60T 1/10; B60T 2270/604; B60W 10/08; B60W 10/188; B60W 2520/10; B60W 2520/30; Y02T 10/7258; Y02T 10/645; Y02T 10/70; Y02T 10/7005; Y02T 10/7077; Y02T 10/72; Y02T 10/7275; F16D 61/00
(Continued)

(56) References Cited

U.S. PATENT DOCUMENTS 5,318,355 A * 6/1994 Asanuma ................ B60L 3/108
180/165
5,927,829 A * 7/1999 Saga ......................... B60L 7/24
180/165

(Continued)

*Primary Examiner* — Courtney Heinle
*Assistant Examiner* — Angelina Shudy
(74) *Attorney, Agent, or Firm* — Mintz Levin Cohn Ferris Glovsky and Popeo, P.C.; Peter F. Corless

(57) ABSTRACT

A method for calculating a regenerative braking amount of a hybrid electric vehicle includes calculating a first possible available charging power of a motor when regenerative braking of the hybrid electric vehicle is required; calculating a second possible charging power of the motor by using the first possible charging power of the motor; converting the second possible charging power of the motor to a torque of a wheel axle; calculating an available amount of regenerative braking by reflecting a coasting torque on the torque of the wheel axle; generating a motor torque command based on the available amount of regenerative braking; and calculating a final regenerative braking amount by monitoring a real motor torque according to the motor torque command and correcting an error.

9 Claims, 4 Drawing Sheets

(51) Int. Cl.
  *B60W 10/08*  (2006.01)
  *B60W 10/188*  (2012.01)
  *B60L 11/08*  (2006.01)
  *B60L 11/14*  (2006.01)
  *B60L 11/18*  (2006.01)
  *B60L 15/20*  (2006.01)
  *B60T 1/10*  (2006.01)
  *F16D 61/00*  (2006.01)

(52) U.S. Cl.
  CPC .............. *B60L 15/2009* (2013.01); *B60T 1/10* (2013.01); *B60T 8/326* (2013.01); *B60W 10/08* (2013.01); *B60W 10/188* (2013.01); *F16D 61/00* (2013.01); *B60L 2240/12* (2013.01); *B60L 2240/423* (2013.01); *B60L 2260/44* (2013.01); *B60T 2270/604* (2013.01); *B60W 2520/10* (2013.01); *B60W 2520/30* (2013.01); *Y02T 10/645* (2013.01); *Y02T 10/70* (2013.01); *Y02T 10/7005* (2013.01); *Y02T 10/7077* (2013.01); *Y02T 10/72* (2013.01); *Y02T 10/7275* (2013.01)

(58) Field of Classification Search
  USPC ....................................................... 701/22, 70
  See application file for complete search history.

(56) References Cited

U.S. PATENT DOCUMENTS

| | | | | |
|---|---|---|---|---|
| 6,176,808 | B1* | 1/2001 | Brown | B60K 6/365 180/65.25 |
| 6,549,840 | B1* | 4/2003 | Mikami | B60K 6/365 180/243 |
| 7,167,783 | B2* | 1/2007 | Park | B60K 6/48 303/152 |
| 7,331,899 | B2* | 2/2008 | Ortmann | B60K 6/365 477/6 |
| 7,673,948 | B2* | 3/2010 | Otomo | B60T 8/26 188/358 |
| 9,452,753 | B2* | 9/2016 | Kodawara | B60L 1/003 |
| 2004/0054450 | A1* | 3/2004 | Nakamura | B60L 7/16 701/22 |
| 2005/0143878 | A1* | 6/2005 | Park | B60K 6/48 701/22 |
| 2005/0264102 | A1* | 12/2005 | Tezuka | B60K 7/0007 303/152 |
| 2008/0255716 | A1* | 10/2008 | Bandai | B60T 1/10 701/22 |
| 2010/0160111 | A1* | 6/2010 | Yamanaka | F16H 61/66272 477/45 |
| 2011/0118920 | A1* | 5/2011 | Kim | B60K 6/48 701/22 |
| 2011/0118921 | A1* | 5/2011 | Park | B60K 6/48 701/22 |
| 2011/0276243 | A1* | 11/2011 | Minarcin | B60W 10/08 701/70 |
| 2012/0234133 | A1* | 9/2012 | Ikegami | B60K 6/48 74/661 |
| 2014/0303824 | A1* | 10/2014 | Ozaki | B60L 7/18 701/22 |
| 2015/0006000 | A1* | 1/2015 | Kawata | B60K 6/48 701/22 |
| 2015/0032353 | A1* | 1/2015 | Ajiro | B60T 13/586 701/70 |
| 2015/0057856 | A1* | 2/2015 | Ueda | B60L 11/14 701/22 |
| 2015/0094889 | A1* | 4/2015 | Oh | B60T 13/74 701/22 |
| 2015/0120106 | A1* | 4/2015 | Yu | B60W 10/18 701/22 |
| 2015/0251657 | A1* | 9/2015 | Johri | B60L 7/10 701/22 |
| 2015/0266383 | A1* | 9/2015 | Kidston | B60L 7/26 701/70 |
| 2015/0283920 | A1* | 10/2015 | Toyota | B60L 7/14 701/22 |
| 2016/0059705 | A1* | 3/2016 | Kim | B60L 7/18 701/22 |
| 2016/0105132 | A1* | 4/2016 | Kim | H02P 3/14 701/22 |
| 2016/0159339 | A1* | 6/2016 | Cho | B60W 20/15 701/22 |
| 2016/0229392 | A1* | 8/2016 | Sugitani | B60W 20/14 |
| 2016/0280201 | A1* | 9/2016 | Choi | B60W 20/00 |

* cited by examiner

APPARATUS AND METHOD FOR CALCULATING REGENERATIVE BRAKING AMOUNT OF HYBRID ELECTRIC VEHICLE

CROSS-REFERENCE TO RELATED APPLICATION

This application claims under 35 U.S.C. §119(a) priority to and the benefit of Korean Patent Application No. 10-2014-0098530 filed in the Korean Intellectual Property Office on Jul. 31, 2014, the entire contents of which are incorporated herein by reference.

BACKGROUND (a) Field of the Invention

The present invention relates to an apparatus and a method for calculating a regenerative braking amount of a hybrid electric vehicle, more particularly, to an apparatus and a method that calculate a torque of a wheel axle depending on a motor, and calculate a regenerative braking amount based on the torque of the wheel axle.

(b) Description of the Related Art

Generally, a hybrid electric vehicle is powered by an engine which generates torque from fuel combustion and an electric motor which generates torque from an electric battery.

Hybrid electric vehicles use regenerative braking technology when a braking control according to a brake pedal is performed. In particular, the regenerative braking of the hybrid electric vehicle is a technology which applies a counter torque to the motor by using energy generated during braking to generate electric energy and stores the generated electric energy in a battery.

In the case of regenerative braking, a hybrid controller (HCU) calculates a total braking amount and a regenerative braking amount by considering an operating state of the motor when a driver requests to brake. In addition, an electric brake system (EBS) also calculates the total braking amount and controls hydraulic pressure supplied to a brake cylinder of a wheel in order to satisfy the total braking amount.

In particular, regenerative braking performs braking based on a cooperative control of the EBS which plays a part in hydraulic pressure braking and the HCU.

However, in a transmission mounted electric device (TMED) type of the hybrid electric vehicle which includes a multistage transmission, the hybrid electric vehicle calculates the regenerative braking amount based on a real torque of the motor positioned at a front end of the transmission. If the regenerative braking amount is calculated on the basis of the motor, the regenerative braking amount which is transmitted to the wheel may not be accurately calculated according to a disturbance such as a shift characteristic or a torque characteristic of the motor.

According to the conventional art, regenerative braking amount cannot be calculated because the conventional art does not consider the torque characteristic of the motor and a shift characteristic of multistage transmission that are changed by a charging limit of the motor. Accordingly, the regenerative braking amount is output too much or too little and the total braking amount is changed, so a slip or a shock may be generated during braking.

The above information disclosed in this Background section is only for enhancement of understanding of the background of the invention and therefore it may contain information that does not form the prior art that is already known in this country to a person of ordinary skill in the art.

SUMMARY

The present invention provides an apparatus and a method for calculating a regenerative braking amount of a hybrid electric vehicle having advantages of calculating a torque of a wheel axle depending on a motor and a regenerative braking amount based on the torque of the wheel axle.

An exemplary embodiment of the present invention provides a method for calculating a regenerative braking amount of a hybrid electric vehicle that may include calculating a first possible available charging power of a motor when regenerative braking of the hybrid electric vehicle is required; calculating a second possible charging power of the motor by using the first possible charging power of the motor; converting the second possible charging power of the motor to a torque of a wheel axle; calculating an available amount of regenerative braking by reflecting a coasting torque on the torque of the wheel axle; generating a motor torque command based on the available amount of regenerative braking; and calculating a final regenerative braking amount by monitoring a real motor torque according to the motor torque command and correcting an error.

The method may further include performing regenerative braking according to the final regenerative braking amount after calculating the final regenerative braking amount.

The first possible charging power of the motor may be calculated by considering a charging limit power of a battery, a consuming power of a part load and an available charging power of the motor.

The second possible charging power of the motor may be calculated by considering shift efficiency based on a maximum torque that the motor can output within a range of the available charging power of the motor.

The second possible charging power of the motor may be passed through a low pass filter in order to consider shift efficiency.

The second possible charging power of the motor may be converted by using a minimum vehicle speed and a wheel speed of the hybrid electric vehicle.

The available amount of regenerative braking may be limited to a maximum available amount in a 1 speed stage of the transmission.

Another exemplary embodiment of the present invention provides an apparatus for calculating a regenerative braking amount of a hybrid electric vehicle that may include a vehicle speed sensor configured to detect a vehicle speed; a brake pedal position sensor (BPS) configured to detect a position of a brake pedal; an electric brake system (EBS) configured to calculate a total braking amount based on signals output from the vehicle speed sensor and the brake pedal position sensor and control hydraulic pressure supplied to a brake cylinder of a wheel according to a braking amount of hydraulic pressure; and a hybrid controller (HCU) configured to calculate a possible charging power of a motor when regenerative braking of the hybrid electric vehicle is required, and calculate a regenerative braking amount by converting the possible charging power of the motor to a torque of a wheel axle, wherein the hybrid controller may perform regenerative braking according to the regenerative braking amount and output a signal to the EBS for performing a hydraulic pressure braking so as to satisfy the total braking amount.

The hybrid controller may calculate the possible charging power of the motor by considering a charging limit power of a battery, a consuming power of a part load, an available charging power of the motor and shift efficiency.

The hybrid controller may convert the possible charging power of the motor to the torque of the wheel axle by using a minimum vehicle speed and a wheel speed of the hybrid electric vehicle.

As described above, according to an exemplary embodiment of the present invention, the regenerative braking amount based on the wheel axle previously considering a system limit such as the battery, the motor, and the shift may be accurately calculated. Thus, a braking linearity of the hybrid electric vehicle may be improved in accordance with the accurate regenerative braking amount. In addition, a braking performance of the hybrid electric vehicle during shifting can be increased, and a drivability and fuel consumption of the hybrid electric vehicle may be improved.

DETAILED DESCRIPTION OF THE EMBODIMENTS

Figure 1:
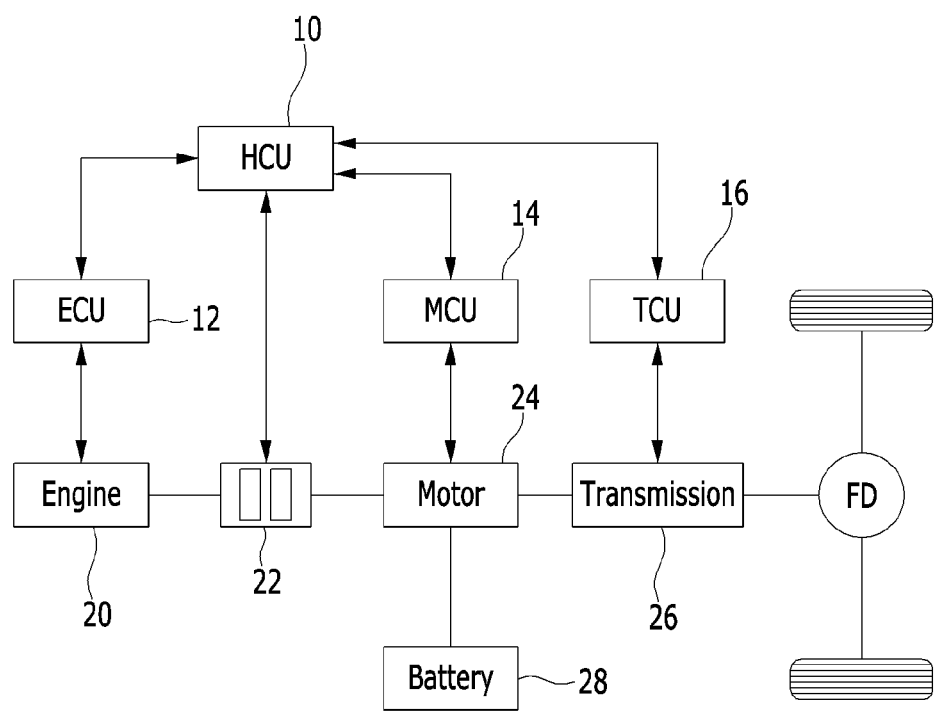
FIG. 1 is a schematic diagram of a hybrid system to which a method for calculating a regenerative braking amount of a hybrid electric vehicle is applied according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Like reference numerals designate like elements throughout the specification.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar terms as used herein is inclusive of motor vehicles in general, including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example both gasoline-powered and electric-powered vehicles.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Further, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present invention will hereinafter be described in detail with reference to the accompanying drawings.

FIG. 1 is a schematic diagram of a hybrid system to which a method for calculating a regenerative braking amount of a hybrid electric vehicle is applied according to an exemplary embodiment of the present invention.

The hybrid system as shown in FIG. 1 is an exemplary embodiment of the present invention. A method for calculating a regenerative braking amount of a hybrid electric vehicle according to the exemplary embodiment of the present invention may not only be applied to the hybrid system as shown in FIG. 1, but may also be applied to other hybrid systems.

As shown in FIG. 1, the hybrid system to which the method for calculating a regenerative braking amount of a hybrid electric vehicle is applied according to the exemplary embodiment of the present invention includes a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

The HCU 10 controls operation of other controllers which mutually exchange information in an entire operation of a hybrid electric vehicle, so the HCU 10 controls output torque of the engine 20 and the motor 24 by cooperating with the other controllers.

The ECU 12 controls an entire operation of the engine 20 according to conditions of the engine 20, such as a demand torque of a driver, a coolant temperature, and an engine torque.

The MCU 14 controls an entire operation of the motor 24 according to a demand torque of a driver, a driving mode of the hybrid electric vehicle, and an SOC (State of Charge) condition of the battery 28.

The TCU 16 controls an entire operation of the transmission 26 such as speed ratios of the transmission 26 depending on output torque of the engine 20 and the motor 24, and an amount of regenerative braking.

The engine 20 outputs power as a power source while turned on.

The engine clutch 22 is disposed between the engine 20 and the motor 24 to receive a control signal of the HCU 10, and selectively connects the engine 20 and the motor 24 according to a driving mode of the hybrid electric vehicle.

The motor 24 is operated by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing of the engine clutch 22 as an input torque and selects a shift gear according to a vehicle speed and a driving condition to output driving force to a driving wheel and maintain driving.

The battery 28 is composed of a plurality of unit cells, and stores a high voltage for supplying a voltage to the motor 24, for example, 400 V or 450 V DC.

The battery 28 supplies a voltage to the motor 24 for supporting power output from the engine 20 in an HEV mode and provides drive force in an EV mode, and is charged by regenerative braking energy.

The hybrid system as described above would be apparent to a person of ordinary skill in the art, so a detailed explanation thereof will be omitted.

Figure 2:
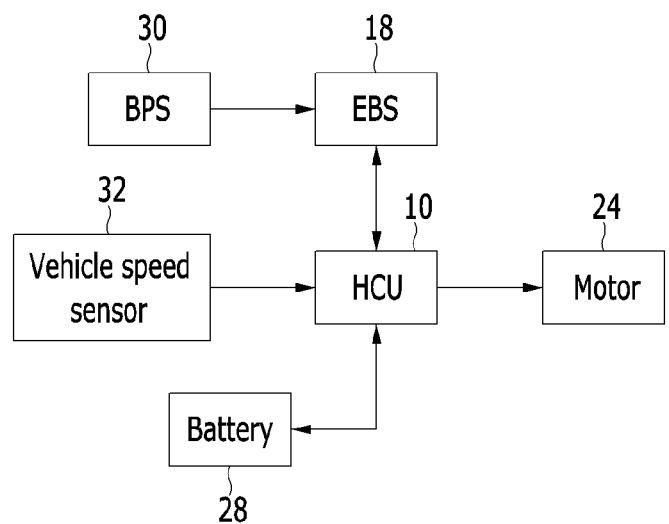
FIG. 2 is a block diagram of an apparatus for calculating a regenerative braking amount of a hybrid electric vehicle according to an exemplary embodiment of the present invention.

FIG. 2 is a block diagram of an apparatus for calculating a regenerative braking amount of a hybrid electric vehicle according to an exemplary embodiment of the present invention.

As shown in FIG. 2, an apparatus for calculating a regenerative braking amount of the hybrid electric vehicle according to the exemplary embodiment of the present invention includes a brake pedal position sensor (BPS) 30, a vehicle speed sensor 32, an electric brake system (EBS) 18, a hybrid controller (HCU) 10, a motor 24 and a battery 28.

The brake pedal position sensor 30 continuously detects a position value of a brake pedal and transmits a monitoring signal to the hybrid controller 10. The hybrid controller 10 may detect a braking demand of a driver according to the position value of the brake pedal. The position value of the brake pedal may be 100% when the brake pedal is pressed fully, and the position value of the brake pedal may be 0% when the brake pedal is not pressed at all.

The vehicle speed sensor 32 mounted to a wheel of the vehicle, detects a speed of the vehicle, and transmits a corresponding signal to the hybrid controller 10.

The electric brake system 18 controls hydraulic pressure supplied to a brake cylinder of a wheel according to a signal output form the hybrid controller 10 or autonomously. The EBS 18 may detect a braking demand of a driver based on signals of the brake pedal position sensor 30 and the vehicle speed sensor 32.

According an exemplary embodiment of the present invention, the EBS 18 detects the braking demand of the driver and calculates a total braking amount, and the hybrid controller 10 calculates a regenerative braking amount and performs regenerative braking control. Thus, the EBS 18 may control hydraulic pressure to perform braking control about a remaining braking amount that is calculated by subtracting the regenerative braking amount from the total braking amount.

The hybrid controller 10 calculates a possible charging power of the motor 24 when regenerative braking of the hybrid electric vehicle is required, and calculates the regenerative braking amount by converting the possible charging power of the motor 24 to a torque of a wheel axle.

The hybrid controller 10 may calculate the possible charging power of the motor by considering a charging limit power of the battery 28, a consuming power of a part load, an available charging power of the motor 24 and shift efficiency.

In addition, the hybrid controller 10 may convert the possible charging power of the motor 24 to the torque of the wheel axle by using a minimum vehicle speed and a wheel speed of the hybrid electric vehicle.

To this end, the hybrid controller 10 may be implemented as at least one processor that is operated by a predetermined program, and the predetermined program may be programmed in order to perform each step of the method for calculating a regenerative braking amount of the hybrid electric vehicle according to the exemplary embodiment of the present invention.

Hereinafter, a method for calculating a regenerative braking amount of the hybrid electric vehicle according to an exemplary embodiment of the present invention will be described in detail with reference to FIGS. 3 and 4.

Figure 3:
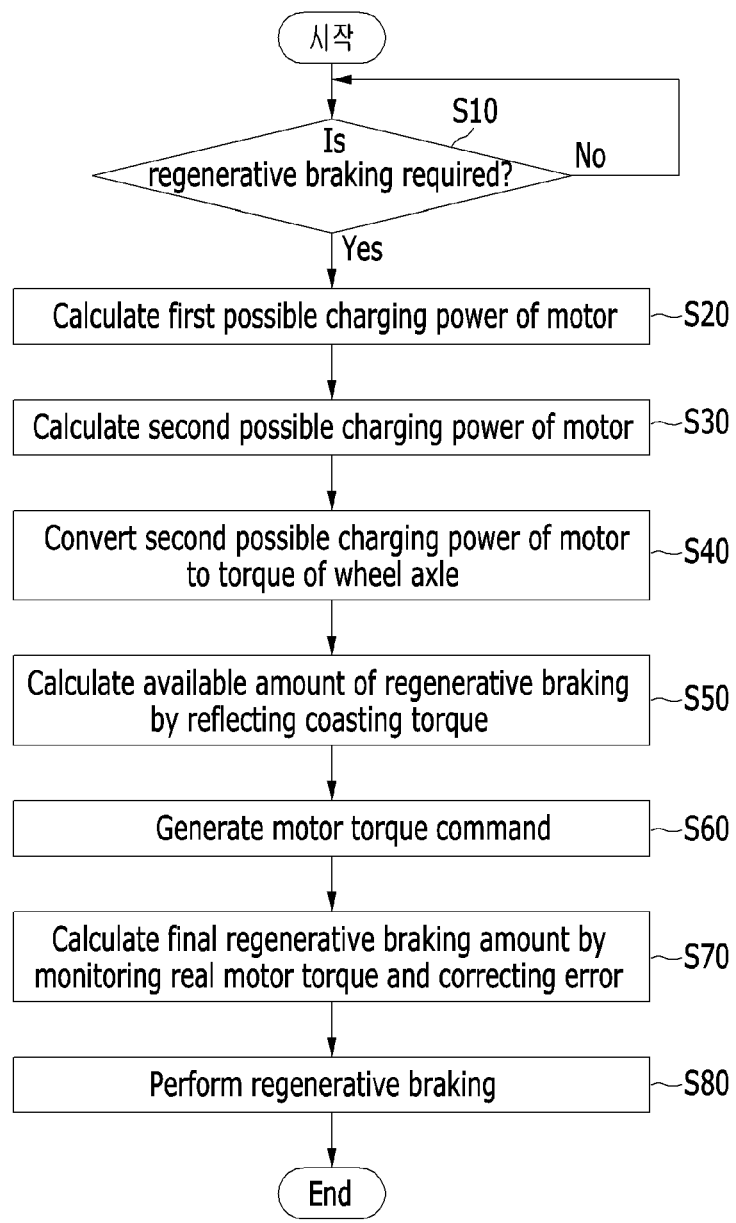
FIG. 3 is a flowchart showing a method for calculating a regenerative braking amount of a hybrid electric vehicle according to an exemplary embodiment of the present invention.

FIG. 3 is a flowchart showing a method for calculating a regenerative braking amount of the hybrid electric vehicle according to the exemplary embodiment of the present invention.

As shown in FIG. 3, a method for calculating a regenerative braking amount of the hybrid electric vehicle according to the exemplary embodiment of the present invention starts with determining whether regenerative braking of the hybrid electric vehicle is required at step S10.

When regenerative braking of the hybrid electric vehicle is required at the step S10, the hybrid controller 10 calculates a first possible charging power of the motor at step S20.

The first possible charging power of the motor may be calculated by considering a charging limit power of the battery 28, a consuming power of a part load and an available charging power of the motor 24.

The hybrid controller 10 calculates a second possible charging power of the motor based on the first possible charging power of the motor at step S30.

The second possible charging power of the motor may be calculated by considering shift efficiency based on a maximum torque that the motor 24 can output within a range of the available charging power of the motor. The shift efficiency may prevent an excessive change of stage during shifting. Thus, the hybrid controller 10 may pass through the second possible charging power of the motor to a low pass filter in order to consider the shift efficiency.

When the second possible charging power of the motor is calculated at the step S30, the hybrid controller 10 converts the second possible charging power of the motor to a torque of a wheel axle at step S40. The hybrid controller 10 may convert the second possible charging power of the motor to the torque of the wheel axle by using a minimum vehicle speed and a wheel speed of the hybrid electric vehicle output from the vehicle speed sensor 32.

When the torque of the wheel axle is calculated at the step S40, the hybrid controller 10 calculates an available amount of regenerative braking by reflecting a coasting torque on the torque of the wheel axle at step S50. The available amount of regenerative braking may be limited to a maximum available amount in a 1 speed stage of the transmission.

After that, the hybrid controller 10 generates a motor torque command based on the available amount of regenerative braking at step S60. The hybrid controller 10 may drive the motor 24 in accordance with the motor torque command, so a real motor torque may be generated by driving of the motor 24.

An error between the motor torque command and the real motor torque may be generated during driving of the motor 24, so the hybrid controller 10 calculates a final regenerative braking amount by monitoring the real motor torque and correcting the error at step S70.

When the final regenerative braking amount is calculated at the step S70, the hybrid controller 10 performs regenerative braking according to the final regenerative braking amount at step S80. The hybrid controller 10 performs regenerative braking according to the final regenerative braking amount and may simultaneously output a signal to the EBS 18 for performing a hydraulic pressure braking of a remaining braking amount that is calculated by subtracting the regenerative braking amount from the total braking amount. Therefore, the hybrid controller 10 may satisfy the braking demand of the driver by summing the final regenerative braking amount and the hydraulic pressure braking amount.

Figure 4:
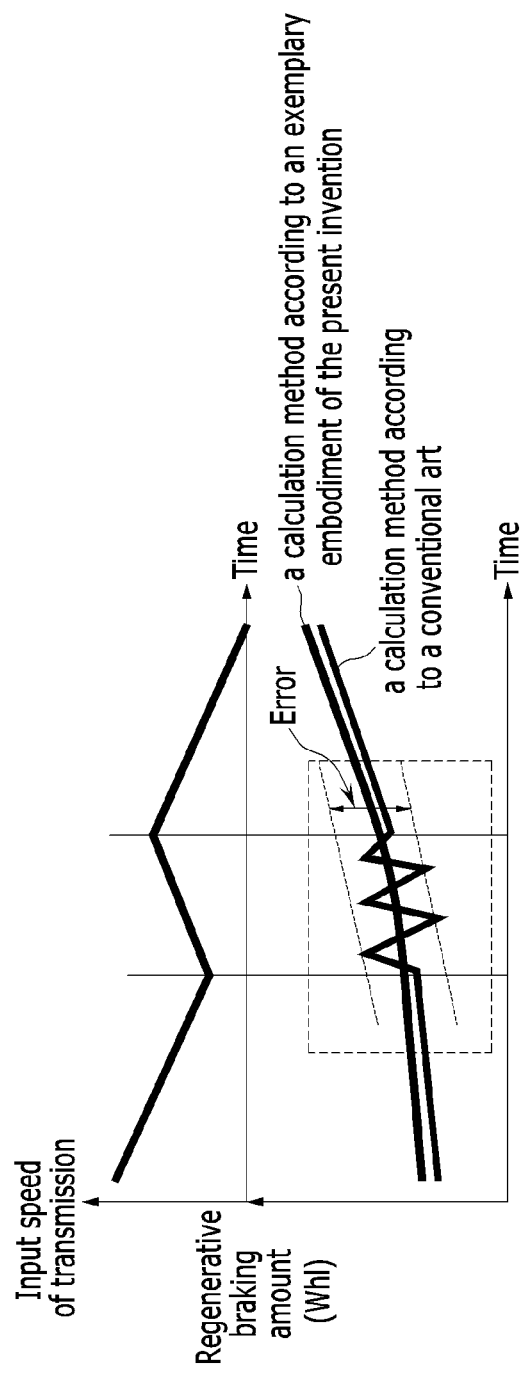
FIG. 4 is a graph of a regenerative braking amount to which a method for calculating a regenerative braking amount of a hybrid electric vehicle is applied.

FIG. 4 is a graph of a regenerative braking amount to which a method for calculating a regenerative braking amount of a hybrid electric vehicle is applied.

As shown in FIG. 4, an input speed of the transmission may be changed according to a system disturbance such as a shift characteristic or a torque characteristic of the motor when regenerative braking of the hybrid electric vehicle is required.

At this time, a calculation method according to a conventional art cannot reflect the input speed of the transmission due to the system disturbance, so an error of the regenerative braking amount may occur.

On the contrary, a calculation method according to the exemplary embodiment of the present invention can calculate the regenerative braking amount based on the wheel axle, so a linearity of the regenerative braking amount may be secured even though the input speed of the transmission is changed. Accordingly, a braking performance of the hybrid electric vehicle during shifting can be increased, and a drivability and fuel consumption of the hybrid electric vehicle may be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for calculating a regenerative braking amount of a hybrid electric vehicle having a motor and a multistage transmission, comprising:
    calculating a first possible charging power of the motor outputted to the multistage transmission when regenerative braking of the hybrid electric vehicle is required;
    calculating a second possible charging power of the motor by using the first possible charging power of the motor based on shift efficiency of the multistage transmission;
    converting the second possible charging power of the motor to a torque of a wheel axle;
    calculating an available amount of regenerative braking by reflecting a coasting torque on the torque of the wheel axle;
    generating a motor torque command based on the available amount of regenerative braking;
    calculating a final regenerative braking amount by monitoring a real motor torque according to the motor torque command and correcting an error; and
    performing regenerative braking according to the final regenerative braking amount after calculating the final regenerative braking amount,
    wherein when the regenerative braking is performed, a hydraulic braking is performed of a remaining braking amount calculated by subtracting the final regenerative braking amount from a total braking amount based on signals outputted from a vehicle speed sensor and a brake pedal position sensor.

2. The method of claim 1, wherein the first possible charging power of the motor is calculated by considering a charging limit power of a battery, a consuming power of a part load, and an available charging power of the motor.

3. The method of claim 1, wherein the second possible charging power of the motor is calculated by considering the shift efficiency based on a maximum torque that the motor can output within a range of the available charging power of the motor.

4. The method of claim 3, wherein the second possible charging power of the motor is passed through a low pass filter in order to consider the shift efficiency.

5. The method of claim 1, wherein the second possible charging power of the motor is converted by using a minimum vehicle speed and a wheel speed of the hybrid electric vehicle.

6. The method of claim 1, wherein the available amount of regenerative braking is limited to a maximum available amount in a 1 speed stage of the multistage transmission.

7. An apparatus for calculating a regenerative braking amount of a hybrid electric vehicle having a motor and a multistage transmission, comprising:
    a vehicle speed sensor configured to detect a vehicle speed;
    a brake pedal position sensor (BPS) configured to detect a position of a brake pedal;
    an electric brake system (EBS) configured to calculate a total braking amount based on signals output from the vehicle speed sensor and the brake pedal position sensor and control hydraulic pressure supplied to a brake cylinder of a wheel according to a braking amount of hydraulic pressure; and
    a hybrid controller (HCU) configured to calculate a first possible charging power of the motor outputted to the multistage transmission when regenerative braking of the hybrid electric vehicle is required and a second possible charging power of the motor by using the first possible charging power of the motor based on shift efficiency of the multistage transmission, and calculate a regenerative braking amount by converting the second possible charging power of the motor to a torque of a wheel axle,
    wherein the hybrid controller performs regenerative braking according to the regenerative braking amount and outputs a signal to the EBS for performing a hydraulic pressure braking so as to satisfy the total braking amount.

8. The apparatus of claim 7, wherein the hybrid controller calculates the first possible charging power of the motor by considering a charging limit power of a battery, a consuming power of a part load, and an available charging power of the motor.

9. The apparatus of claim 7, wherein the hybrid controller converts the second possible charging power of the motor to the torque of the wheel axle by using a minimum vehicle speed and a wheel speed of the hybrid electric vehicle.

* * * * *